(12) United States Patent
Ma et al.

(10) Patent No.: US 9,442,603 B2
(45) Date of Patent: *Sep. 13, 2016

(54) TOUCH PANEL

(71) Applicant: HengHao Technology Co. LTD, Taoyuan County (TW)

(72) Inventors: Kuan-Yen Ma, Taoyuan County (TW); Chien-Wen Lai, New Taipei (TW)

(73) Assignee: Henghao Technology Co. Ltd., Pingjhen, Taoyuan County (TW)

( * ) Notice: Subject to any disclaimer, the term of this patent is extended or adjusted under 35 U.S.C. 154(b) by 111 days.

This patent is subject to a terminal disclaimer.

(21) Appl. No.: 13/677,880

(22) Filed: Nov. 15, 2012

(65) Prior Publication Data

US 2014/0062959 A1 Mar. 6, 2014

(30) Foreign Application Priority Data

Aug. 28, 2012 (TW) .............................. 101131195 A

(51) Int. Cl.
*G06F 15/00* (2006.01)
*G06F 3/042* (2006.01)
*G06F 3/041* (2006.01)

(52) U.S. Cl.
CPC ................ *G06F 3/042* (2013.01); *G06F 3/041* (2013.01)

(58) Field of Classification Search
CPC .................. G06F 3/041–3/045; G06F 3/0488; G06F 3/04883; G06F 3/418
USPC ................................ 345/4–6, 156, 173–178; 178/18.01–19.07; 349/110
See application file for complete search history.

(56) References Cited

U.S. PATENT DOCUMENTS

| | | | |
|---|---|---|---|
| 6,492,700 B1 * | 12/2002 | Lin et al. ........................ | 257/435 |
| 8,717,321 B2 * | 5/2014 | Kim .............................. | 345/173 |
| 2006/0114378 A1 * | 6/2006 | Choi ............................. | 349/110 |
| 2009/0207151 A1 * | 8/2009 | Liu et al. ...................... | 345/174 |
| 2010/0123686 A1 * | 5/2010 | Klinghult et al. ............. | 345/178 |
| 2011/0001723 A1 * | 1/2011 | Fan .............................. | 345/174 |
| 2011/0134070 A1 * | 6/2011 | Wang et al. ................... | 345/174 |
| 2011/0181545 A1 * | 7/2011 | Takahashi ............... | G06F 3/041 345/174 |
| 2011/0273386 A1 * | 11/2011 | Chan ............................ | 345/173 |
| 2011/0304785 A1 * | 12/2011 | Ge et al. ........................ | 349/33 |
| 2013/0044282 A1 * | 2/2013 | Kuwabara et al. ............ | 349/96 |
| 2013/0154949 A1 * | 6/2013 | Jamshidi Roudbari et al. ............................ | 345/173 |
| 2014/0016043 A1 * | 1/2014 | Chen et al. ................... | 349/12 |

FOREIGN PATENT DOCUMENTS

KR 20120038868 A 4/2012
KR 20120066272 A 6/2012

* cited by examiner

*Primary Examiner* — Michael Pervan
*Assistant Examiner* — Andrew Lee
(74) *Attorney, Agent, or Firm* — Donald E. Stout; Stout, Uxa & Buyan, LLP

(57) ABSTRACT

The present invention is directed to a touch panel. The touch panel includes an optical layer disposed on a bottom surface of at least one peripheral edge of a transparent substrate. A light shielding layer is disposed on at least a portion of a bottom surface of the optical layer. A touch sensing layer is disposed below the transparent substrate and the light shielding layer.

9 Claims, 3 Drawing Sheets

TOUCH PANEL

CROSS-REFERENCE TO RELATED APPLICATIONS

The entire contents of Taiwan Patent Application No. 101131195, filed on Aug. 28, 2012, from which this application claims priority, are incorporated herein by reference.

BACKGROUND OF THE INVENTION

1. Field of the Invention

The present invention generally relates to a touch panel, and more particularly to a touch panel having an optical layer with high adhesion.

2. Description of Related Art

A touch screen is an input/output device that adopts sensing technology and display technology, and has been widely employed in electronic devices such as portable or hand-held electronic devices.

A capacitor-based touch panel is a commonly used touch panel that utilizes capacitive coupling effect to detect touch position. Specifically, capacitance corresponding to the touch position changes and is thus detected, when a finger touches a surface of the touch panel.

FIG. 1A and FIG. 1B show a top view and a cross-sectional view, respectively, of a conventional touch panel. A black matrix (BM) 12 is disposed on a bottom surface of a peripheral edge of a glass substrate 11, and a touch sensing layer 13 is disposed on a bottom surface of the glass substrate 11 and the black matrix 12. The touch sensing layer 13 includes a sensing portion 131 not covered by the black matrix 12 and a routing portion 132 located below the black matrix 12. The sensing portion 131 defines an active area or a touching range 14. However, as adhesion between the black matrix 12 and the glass substrate 11 is weak, the black matrix 12 is liable to peeling. Moreover, as the touch sensing layer 13 is very thin, the peripheral area 15 (i.e., an area between the touching range 14 and an area 16) of the sensing portion 131 sometimes suffers from broken wire.

For the reason that the black matrix 12 of the conventional touch panel is liable to peeling, a need has arisen to propose a novel touch panel to overcome disadvantages of the conventional touch panel.

SUMMARY OF THE INVENTION

In view of the foregoing, it is an object of the embodiment of the present invention to provide a touch panel that utilizes an optical layer with high adhesion to improve peeling of a light shielding layer, and uses a light shielding layer with an oblique surface to improve a touchable range of the touch panel.

According to one embodiment, a touch panel includes a transparent substrate, an optical layer, a light shielding layer and a touch sensing layer. The optical layer is disposed on a bottom surface of at least one peripheral edge of the transparent substrate. The light shielding layer is disposed on at least a portion of a bottom surface of the optical layer. The touch sensing layer is disposed below the transparent substrate and the light shielding layer.

DETAILED DESCRIPTION OF THE INVENTION

Figure 2A:
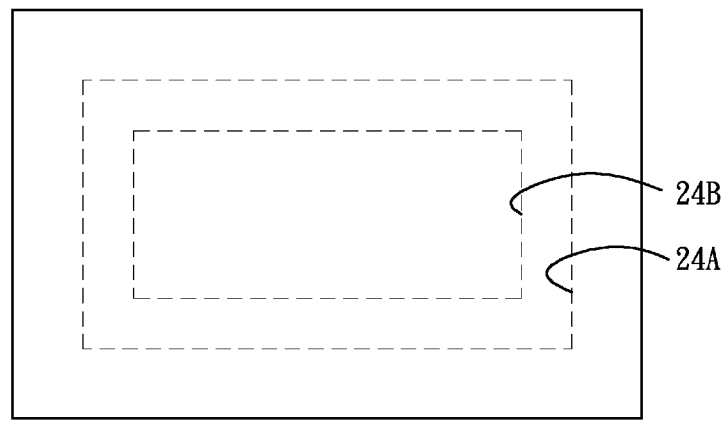
FIG. 2A and FIG. 2B show a top view and a cross-sectional view, respectively, of a touch panel according to a first embodiment of the present invention.
Figure 2B:
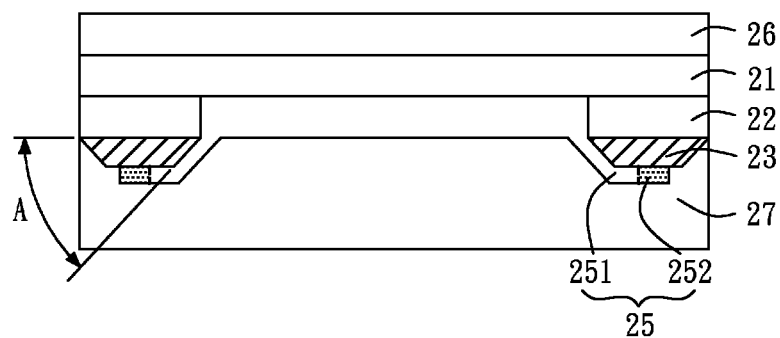

FIG. 2A and FIG. 2B show a top view and a cross-sectional view, respectively, of a touch panel according to a first embodiment of the present invention. For better understanding, only composing elements pertinent to the embodiment are shown in the figures.

As shown in FIG. 2A/B, a transparent substrate 21 is first provided. The transparent substrate 21 may include transparent insulation material with high transmittance, such as glass, Polycarbonate (PC), Polyethylene terephthalate (PET), Polymethyl methacrylate (PMMA) or Cyclic olefin copolymer (COC).

An optical layer 22 is disposed on a bottom surface of at least one peripheral edge of the transparent substrate 21. The optical layer 22 of the embodiment has a high refractive index, for example, greater than 1.5. The optical layer 22 of the embodiment may include transparent organic material such as photoresist, or transparent inorganic material such as silicon oxide (e.g., silicon dioxide) or metal oxide. The optical layer 22 may be formed in one of various manners such as physical vapor deposition, chemical vapor deposition, coating, printing or spinning. In the specification, a direction "top" points to a touch surface of the touch panel, and a direction "bottom" points to a direction opposite the touch surface.

A light shielding layer 23 is disposed on a bottom surface of the optical layer 22. The light shielding layer 23 of the embodiment may, but not necessarily, be a black matrix (BM), and may generally include conductive or insulated material that is capable of shielding against light. According to one aspect of the embodiment, the light shielding layer 23 has greater adhesion to the optical layer 22 than to the transparent substrate 21. Accordingly, the light shielding layer 23 is not liable to peeling.

According to another aspect of the embodiment, the light shielding layer 23 has an oblique surface or sidewall. In one embodiment, an intersection angle A, less than 50 degrees, is made by the oblique surface of the light shielding layer 23 and a bottom surface of the transparent substrate 21. It will be described later in the specification that the oblique surface of the light shielding enlarges the touchable range of the touch panel of the embodiment from an original active area 24B to an enlarged active area 24A.

Figure 1A:
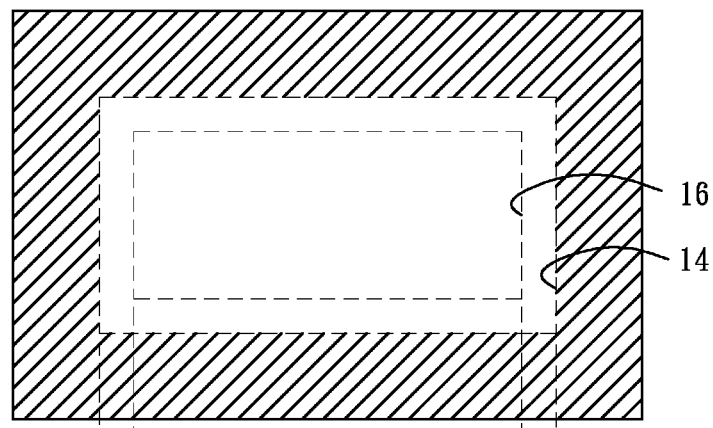
FIG. 1A and FIG. 1B show a top view and a cross-sectional view, respectively, of a conventional touch panel.
Figure 1B:
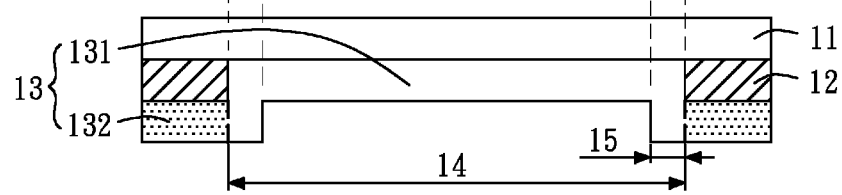

As shown in FIG. 2B, a touch sensing layer 25 is disposed on a bottom surface of the light shielding layer 23 and the transparent substrate 21. The touch sensing layer 25 may, but not necessarily, include Indium tin oxide (ITO) or Indium zinc oxide (IZO). Although one touch sensing layer 25 is shown in FIG. 2B, the touch sensing layer 25, nevertheless, may include multiple sub-layers that may be arranged in single-side single-layer, single-side multi-layer, or double-side multi-layer arrangement. The touch sensing layer 25 may include a sensing portion 251 and a routing portion 252. Specifically, the boundary of the sensing portion 251 and the routing portion 252 lies below non-oblique surface of the light layer 23. Accordingly, the sensing portion 251 defines an enlarged active area or an enlarged touchable range 24A. Compared with the conventional touch panel (e.g., FIG. 1A/B) having a black matrix 12 with sharp sidewall, as the light shielding layer 23 of the embodiment has the oblique surface, the sensing portion 251 near the oblique surface (i.e., an area between the enlarged active area 24A and the original active area 24B) no longer suffers from broken wire, and the touchable range of the touch panel is enlarged.

As shown in FIG. 2A/B, the touch panel of the embodiment may further include an anti-reflective layer 26, which is disposed on a top surface of the transparent substrate 21. The anti-reflective layer 26 may be used to reduce light reflection and prevent the transparent substrate 21 from being contaminated. Moreover, the touch panel of the embodiment may further include an overcoating layer 27, which is disposed on a bottom surface of the touch sensing layer 25. The overcoating layer 27 may be used to protect the touch sensing layer 25. The touch panel discussed above may be independently adopted in electronic devices, or may be accompanied with a display panel (not shown) to result in a touch display.

Figure 3:
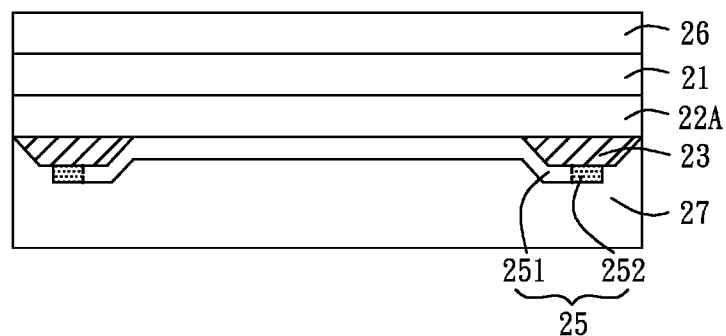
FIG. 3 shows a cross-sectional view of a touch panel according to a second embodiment of the present invention.

FIG. 3 shows a cross-sectional view of a touch panel according to a second embodiment of the present invention. The top view of FIG. 3 is similar to that shown in FIG. 2A, and is thus omitted for brevity. The present embodiment is similar to the first embodiment (FIG. 2B) with the distinctness that, the optical layer 22A covers the bottom surface of the transparent substrate 21 overall, and the touch sensing layer 25 covers the bottom surface of the light shielding layer 23 and the optical layer 22A. Compared with the first embodiment (FIG. 2A/B), as the optical layer 22A with high refractive index is directly or indirectly disposed above the touch sensing layer 25 overall, either touch electrodes of the touch sensing layer 25 or gaps between neighboring touch electrodes perceive substantially the same light reflection (i.e., substantially the same reflectivity) when viewed from top, thereby improving optical characteristics of the touch panel.

Figure 4:
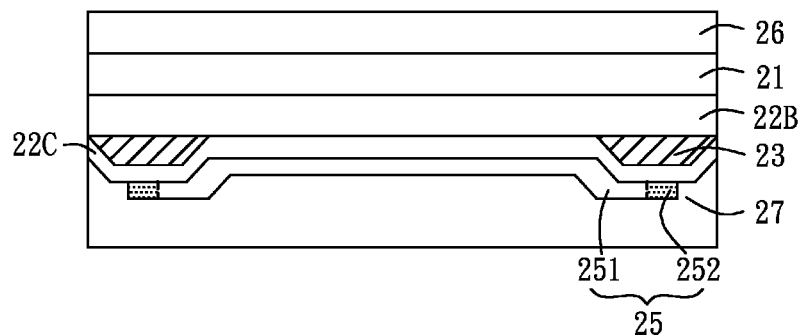
FIG. 4 shows a cross-sectional view of a touch panel according to a third embodiment of the present invention.

FIG. 4 shows a cross-sectional view of a touch panel according to a third embodiment of the present invention. The top view of FIG. 4 is similar to that shown in FIG. 2A, and is thus omitted for brevity. The present embodiment is similar to the second embodiment (FIG. 3) with the distinctness that, in addition to a first optical layer 22B disposed between the transparent substrate 21 and the light shielding layer 23, a second optical layer 22C is further disposed on a bottom surface of the light shielding layer 23 and the first optical layer 22B.

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
   a transparent substrate;
   a first optical layer disposed on an entire bottom surface of the transparent substrate;
   a light shielding layer having an oblique surface, and being disposed on and in contact with a bottom surface of at least one peripheral edge of the first optical layer, the light shielding layer adhering to the first optical layer; and
   a touch sensing layer disposed below the first optical layer and the light shielding layer, the touch sensing layer being in contact with a bottom surface of the light shielding layer and the first optical layer;
   wherein the touch sensing layer comprises a sensing portion and a routing portion, a boundary between the sensing portion and the routing portion lying below a non-oblique surface of the light shielding layer such that an obtained active area is larger than an original active area defined by an inner edge of the light shielding layer, and the touch sensing layer refrains from breaking.

2. The touch panel of claim 1, wherein the transparent substrate comprises transparent insulation material that is glass, Polycarbonate (PC), Polyethylene terephthalate (PET), Polymethyl methacrylate (PMMA) or Cyclic olefin copolymer (COC).

3. The touch panel of claim 1, wherein the light shielding layer comprises black matrix.

4. The touch panel of claim 1, wherein the oblique surface of the light shielding layer and the bottom surface of the transparent substrate make an intersection angle less than 50 degrees.

5. The touch panel of claim 1, wherein the first optical layer has a refractive index greater than 1.5.

6. The touch panel of claim 1, wherein the first optical layer comprises silicon oxide.

7. The touch panel of claim 1, wherein the touch sensing layer comprises transparent conductive material.

8. The touch panel of claim 1, further comprising an anti-reflective layer disposed on a top surface of the transparent substrate.

9. The touch panel of claim 1, further comprising an overcoating layer disposed on a bottom surface of the touch sensing layer.

* * * * *